United States Patent [19]

Spragins et al.

[11] Patent Number: 5,448,852
[45] Date of Patent: Sep. 12, 1995

[54] REINFORCED RODENT BAIT STATION

[75] Inventors: Cisse W. Spragins, Madison; Richard J. Ray, Plymouth; Malcolm G. Stack, Madison, all of Wis.

[73] Assignee: Bell Laboratories, Inc., Madison, Wis.

[21] Appl. No.: 223,950

[22] Filed: Apr. 6, 1994

[51] Int. Cl.⁶ .......................................... A01M 25/00
[52] U.S. Cl. ..................................................... 43/131
[58] Field of Search ........................ 43/131, 132.1, 121

[56] References Cited

U.S. PATENT DOCUMENTS

| | | | |
|---|---|---|---|
| 1,561,644 | 11/1925 | Hanson | 43/131 |
| 2,944,364 | 7/1960 | Kelly | 43/131 |
| 3,007,595 | 11/1961 | Remley | 220/4 |
| 3,351,270 | 11/1967 | Hohnjec | 229/44 |
| 3,550,308 | 12/1970 | Ibach | 43/121 |
| 4,026,064 | 5/1977 | Baker | 43/131 |
| 4,550,525 | 11/1985 | Baker | 43/131 |
| 4,619,071 | 10/1986 | Willis | 43/131 |
| 4,658,536 | 4/1987 | Baker | 43/131 |
| 4,660,320 | 4/1987 | Baker | 43/131 |
| 4,747,230 | 5/1988 | Zalesky | 43/121 |
| 4,761,912 | 8/1988 | Dyer et al. | 43/121 |
| 4,903,832 | 2/1990 | Stewart | 206/366 |
| 5,040,327 | 8/1991 | Stack | 43/131 |
| 5,044,113 | 9/1991 | Stack et al. | 43/131 |
| 5,136,803 | 8/1992 | Sykes | 43/131 |

OTHER PUBLICATIONS

"Rodent Control Product and Label Catalog," pp. 22, 23, Bell Laboratories, Inc., Madison, Wis. c. 1991

*Primary Examiner*—Kurt Rowan
*Attorney, Agent, or Firm*—Lathrop & Clark

[57] ABSTRACT

An integrally molded plastic rodenticide dispenser has a base with a floor from which exterior sidewalls extend upwardly. A lid is joined to the base by an integral hinge. The lid is pivotal about the hinge to selectively cover and uncover the base. A passageway for pests, in particular rodents such as rats, is formed within the interior volume of the covered base by two converging barriers, the ends of which are spaced from one another to define a rodent feeding trough. Each barrier is comprised of two segments: a base barrier segment which is integrally formed with the base and extends upwardly from the base floor a distance less than the height of the base sidewalls, and a lid barrier segment which is integrally formed with the lid and which protrudes from the lid. The lid barrier segment is aligned with the base barrier segment when the lid covers the base to define a barrier across a portion of the base to block the passage of pests through the barrier. Pairs of prongs extend upwardly from the base barrier segment in spaced opposed relation, such that the lid barrier segment when it covers the base is engaged between the prongs to thereby restrict displacement of the lid barrier segment. Two spaced pockets are formed within the base which have ledges which receive lid protrusions. The locks so formed are inaccessible to tamperers, yet are conveniently opened by those provided with a two-tabbed key.

9 Claims, 5 Drawing Sheets

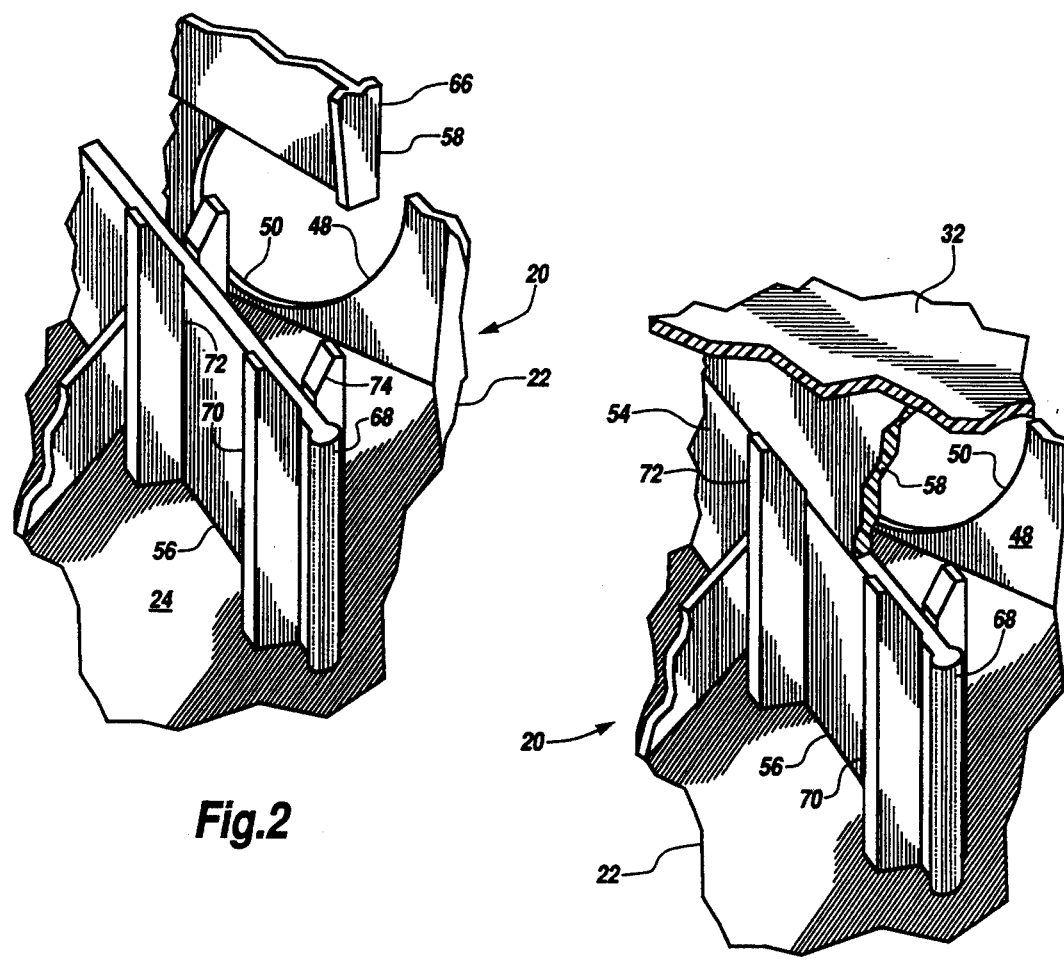
Fig.2
Fig.3
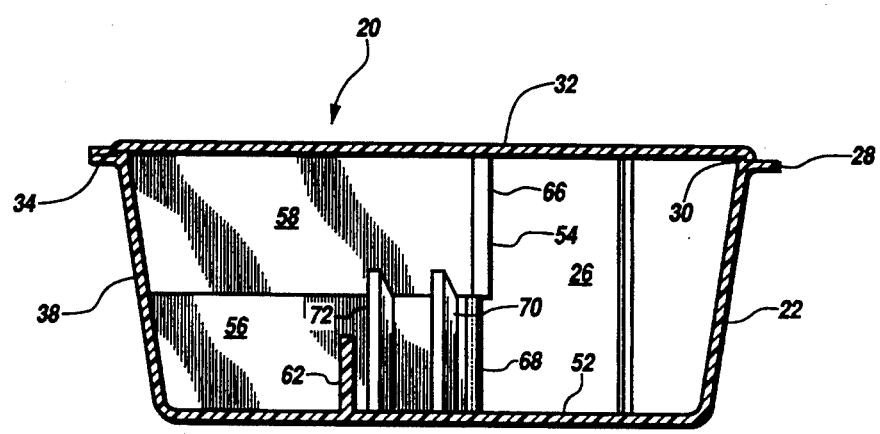
Fig.6

REINFORCED RODENT BAIT STATION

FIELD OF THE INVENTION

The present invention relates to vermin exterminating apparatus in general, and to dispensers of rodenticide in particular.

BACKGROUND OF THE INVENTION

Rodents such as rats are not only a nuisance, but can be extremely costly wherever food is stored or transported, consuming vast amounts of grain and other foodstuffs. Furthermore, rats spread disease, and can be dangerous to domestic animals and humans. Many modem rodenticides are slow-acting chemical substances which are dispensed with food which is attractive to rodents. Preferably the rodenticides do not cause immediate rodent death, hence avoiding evidence at the rodenticide dispensing area of the lethality of the apparently desirable rodent bait. To maximize rodenticide effectiveness at a particular infested region, the bait and rodenticide mixture is dispensed within a container which may be fixed in place. These dispensers or bait stations enclose the bait, keeping it dry and preventing the displacement of the rodenticide. Bait stations must make the bait easily accessible to rodents, but at the same time must restrict access to the rodenticide by domestic animals and children. For durability and low cost, bait stations have advantageously been formed as unitary injection-molded plastic units, with a plastic lid joined by an integrally molded hinge to a plastic base. Bait stations for extermination of mice have formed the barrier within the station by an upwardly extending wall which is closely spaced from or in abutment with the lid. Bait stations for use with rats, however, must be significantly larger than those used with mice, and a single walled plastic barrier is usually not sufficiently stiff to provide the necessary resistance to crushing. Furthermore, the limitations of injection molding make it particularly difficult to mold deep solid walls on the interior of a container. Larger bait stations have formed barriers by molding a double-walled structure which extends from the base floor. Double walls, in certain applications, are susceptible to trapping dirt and debris, and are hence less amenable to cleaning.

What is needed is a low cost, stiff rodent bait station which is large enough to accommodate rats.

SUMMARY OF THE INVENTION

The rodent bait station of the present invention is an integrally molded plastic rodenticide dispenser which has a base with a floor from which exterior sidewalls extend upwardly. A lid is joined to the base by an integral hinge. The lid is pivotal about the hinge to selectively cover and uncover the base. A passageway for pests, in particular rodents such as rats, is formed within the interior volume of the covered base by two converging barriers, the ends of which are spaced from one another to define a rodent feeding trough. Each barrier is comprised of two segments: a base barrier segment which is integrally formed with the base and extends upwardly from the base floor a distance less than the height of the base sidewalls, and a lid barrier segment which is integrally formed with the lid and which protrudes from the lid. The lid barrier segment is aligned with the base barrier segment when the lid covers the base to define a barrier across a portion of the base to block the passage of pests through the barrier. Pairs of prongs extend upwardly from the base barrier segment in spaced opposed relation, such that the lid barrier segment when it covers the base is engaged between the prongs to thereby restrict displacement of the lid barrier segment. The barrier comprised of two segments is less costly to mold, necessitating a shallower mold draft, and the prongs provide structural stiffness to the barriers to allow the dispenser to withstand compressive loads.

To restrict unauthorized access while facilitating authorized opening of the unit, two pockets are formed on the base which each have two perpendicular ledges which face downwardly. Two pairs of prongs arc formed on the lid to engage with the ledges within each pocket and to thus define two spaced locks. The pair of locks makes opening of the unit without a set of special keys more difficult. The locks arc positioned such that the keys are bent toward the hinge to effect release of the lid from the base, allowing the unit to be opened without being removed from its installed location.

It is an object of the present invention to provide a rodent bait dispenser which is economically molded of plastic.

It is a further object of the present invention to provide a rodent bait station which may be subjected to compressive loads without substantially distorting the interior barriers.

It is an additional object of the present invention to provide a rodent bait station which is difficult to open for unauthorized users such as children, but which is simple to open for those supplied with a specially configured key.

It is also an object of the present invention to provide a rodent bait station which will admit rodents such as rats.

Further objects, features and advantages of the invention will be apparent from the following detailed description when taken in conjunction with the accompanying drawings.

BRIEF DESCRIPTION OF THE DRAWINGS

FIG. 2 is a fragmentary isometric view of the bait station of FIG. 1 with the lid in a partially closed configuration.

FIG. 3 is a fragmentary isometric view of the bait station of FIG. 2 with the lid closed.

FIG. 6 is a cross-sectional view of the bait station of FIG. 4 taken along section line 6—6.

DESCRIPTION OF THE PREFERRED EMBODIMENT

Figure 1:
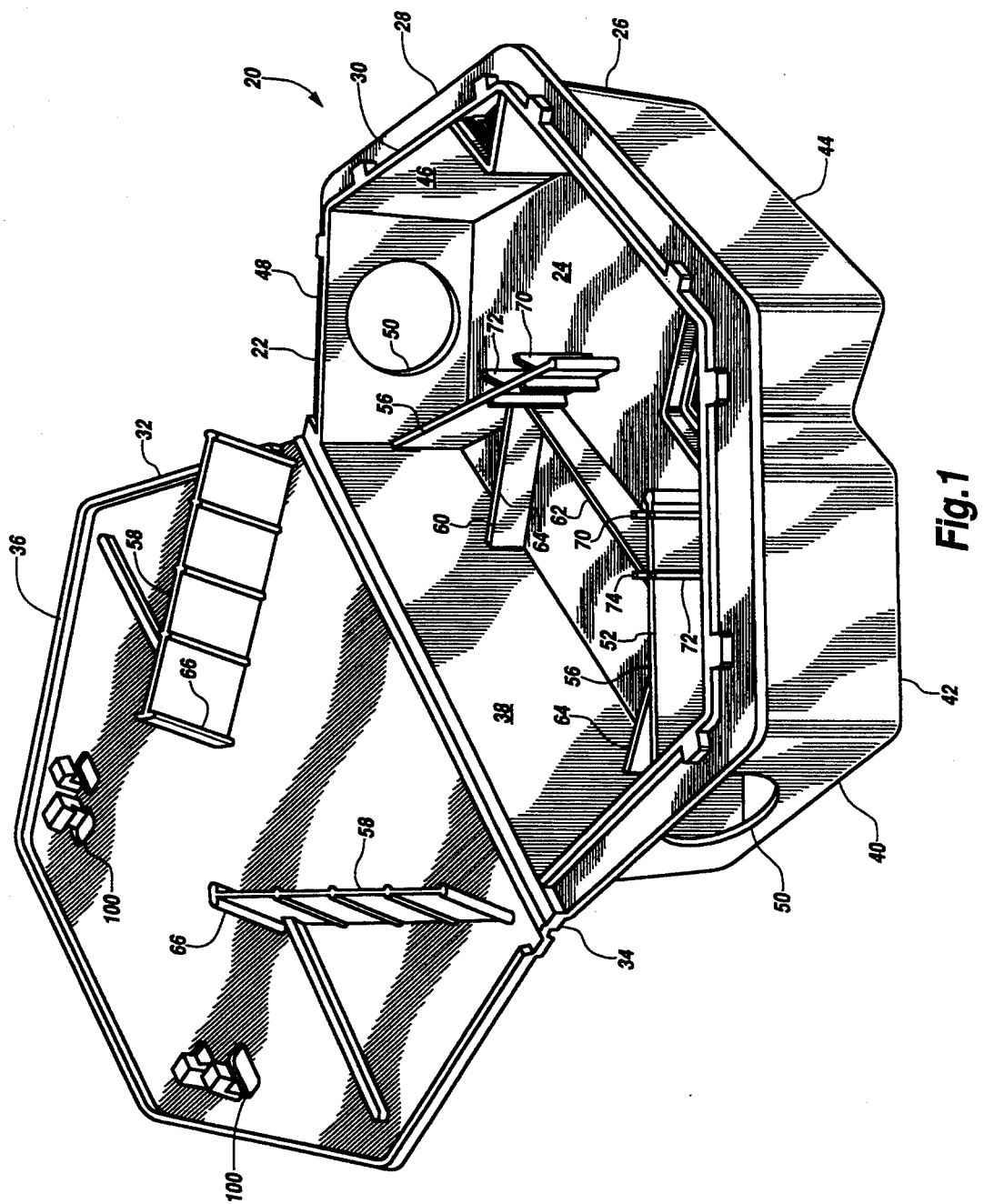
FIG. 1 is an isometric view of the bait station of this invention with the lid open.

Referring more particularly to FIGS. 1-12 wherein like numbers refer to similar parts, a rodent bait station 20 is shown in an open configuration in FIG. 1. The bait station is preferably formed of injection molded plastic and has an upwardly opening base 22 which has a floor 24 which rests on a surface and a sidewall 26 which extends upwardly from the floor. A flange 28 extends outwardly from the sidewall 26 below the level of an upwardly extending rim 30. A lid 32 extends from the base 22 along an integral plastic hinge 34 and is pivotable between an open configuration, shown in FIG. 1, and a closed position, shown in FIGS. 4 and 6. The lid has a downwardly extending skirt 36 which engages against the base flange 28 when closed to form a seal against entry of moisture and debris.

The base has a hinge sidewall segment 38 which is positioned beneath the hinge 34, and five narrower side wall segments 40, 42, 44, 46, 48 which form the side wall 26. The two sidewall segments 40, 48, which are adjacent to the hinge sidewall segment 38 have circular openings 50 formed therein to permit the entrance and egress of rodents from the interior of the bait station 20. The side wall segments 42, 46 which extend from the segments 40, 48, with the rodent openings extend at approximately right angles to one another, and are connected by the side wall segment 44. The right angle segments 42, 46 allow the bait station 20 to be placed in a corner of a room where two walls meet.

A passageway 52 for rodents is defined between the sidewall segments 42, 44, 46 and two composite barriers 54. Each barrier 54 is comprised of a base barrier segment 56 and a lid barrier segment 58. Each base barrier segment 56 extends upwardly substantially perpendicular to the base floor 24 to a height below the level of the base rim 30. Each lid barrier segment 58 extends downwardly from the lid 32 and mates with a base barrier segment 56 to form a barrier 54 which is resistant to penetration by rodents. In a bait station which is about three inches high, the base barrier segment 56 and the lid barrier segment 58 would both be about one and a half inches high.

In order to most effectively utilize the quantities of rodenticide used with the bait station 20, it is desirable that the rodenticide be retained in a feeding trough 60 located between the barriers 54. The trough 60 has a front wall 62 and two side walls 64 which are approximately one quarter the height of the base 22. The rodenticide which is retained in the trough 60 is accessible to rodents for feeding, but is not directly in the path of the rodent passageway 52, which prevents the rodenticide from being tracked outside of the bait station 20. Retention of unconsumed rodenticide within the bait station 20 is desirable to keep it out of contact with nontargeted animals.

The base barrier segments 56 are solid thin strips of molded plastic material. Hence the underside of the base floor 26 is unbroken and has no crevasses or cracks which may collect foreign matter. However, thin unitary walls are inherently less rigid than a double-walled structure. To give the desired rigidity to the bait station 20, the barrier segments 56, 58 have rigidifying structure. Each lid barrier segment 58 has a generally vertical flange 66 at the end of the lid barrier segment away from the hinge wall 38.

Each base barrier segment 56 has a post 68 positioned beneath a lid barrier segment flange 66 the diameter of which post is approximately twice the thickness of the base barrier segment 56.

As shown in FIGS. 2 and 3, each base barrier segment 56 has two sets of prongs 70, 72 which extend upwardly from the base floor 26 and are integrally formed with the barrier segment. Each prong 70, 72 is a narrow, generally rectangular strip of plastic which adds stiffness to the base barrier segment. Furthermore, each prong 70, 72 extends above the level of the base barrier segment 56 and has a ramped surface 74.

When the lid 32 is closed on the base 22, the lid barrier segments 58 are engaged between the pairs of prongs 70, 72 and are guided into alignment with the base barrier segments 56. Furthermore, the prongs 70, 72 restrict the lid barrier segments 58 from being displaced from alignment with the base barrier segments 56.

The stiffness of the composite barriers 54 is helpful in maintaining the integrity of the bait station 20 under difficult conditions which include impact, rough handling, and inclement weather.

Because it is essential that rodenticides remain out of reach of unauthorized persons, in particular children, bait stations are provided with mechanical locks to prohibit access. Prior art bait stations, such as the one disclosed in U.S. Pat. No. 5,040,327 to Stack et at., have utilized two barbed lid protrusions set at right angles to one another which engage beneath two ledges formed on the base.

Figure 4:
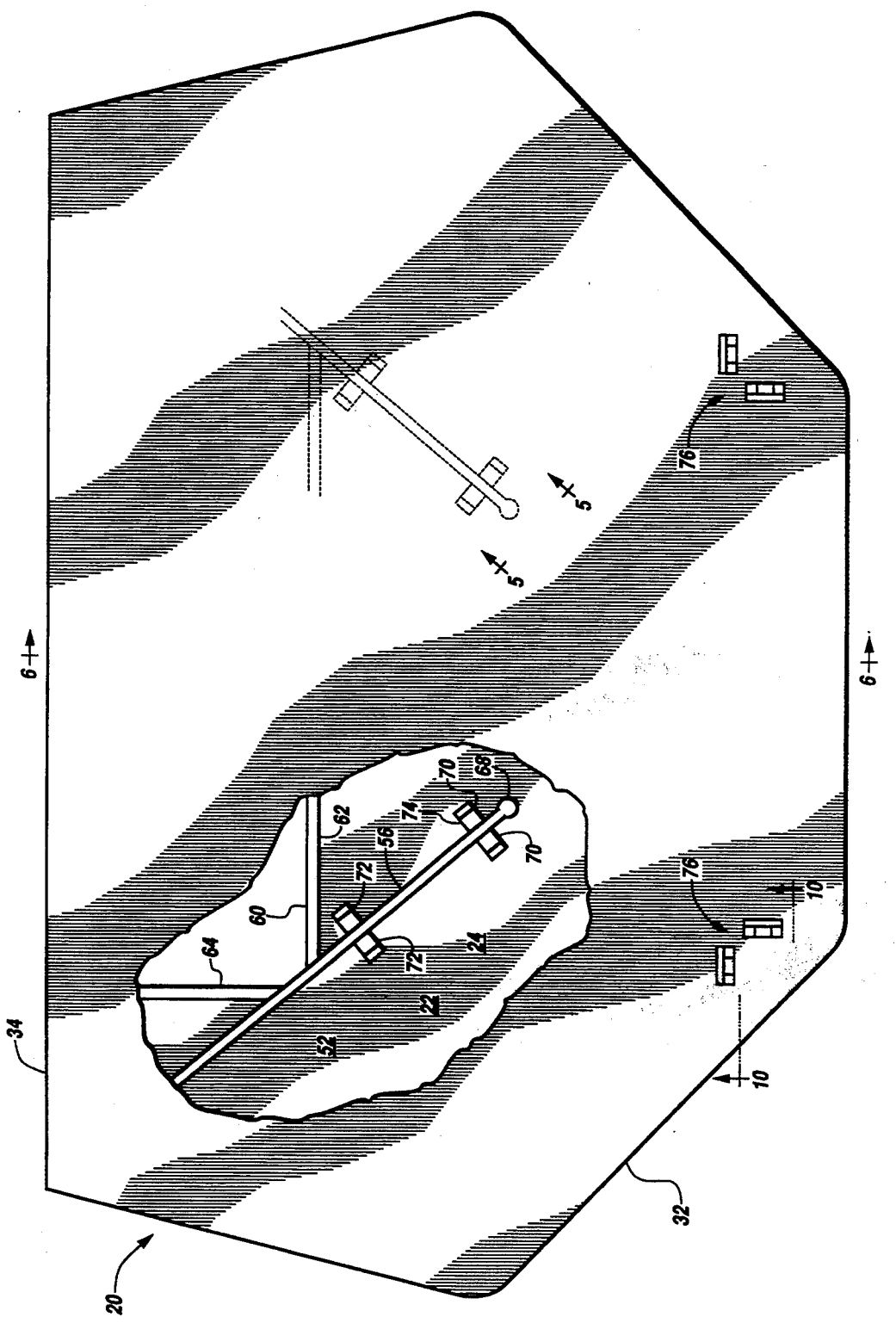
FIG. 4 is a partially broken away, top plan view of the bait station of FIG. 1.
Figure 5:
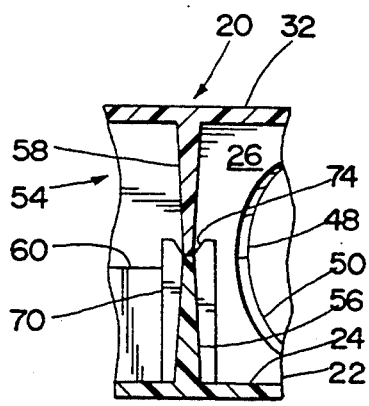
FIG. 5 is a cross-sectional view of the bait station of FIG. 4 taken along section line 5—5.

The bait station of the present invention, as shown in FIG. 4, has two locks 76. Each lock 76 is comprised of two barbed protrusions 78 formed on the lid 32 which engage with downwardly facing ledges 80 formed on the base 22.

Figure 7:
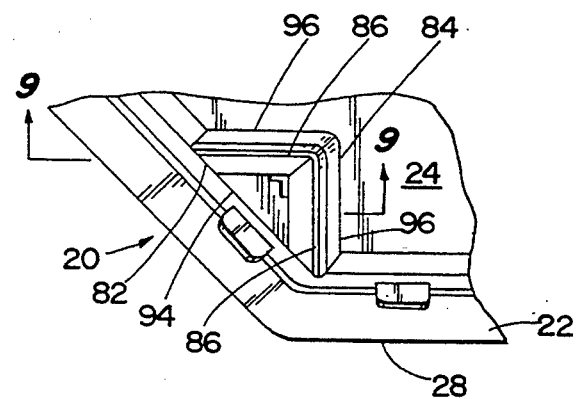
FIG. 7 is a fragmentary top plan view of one of the two base locks of the bait station of FIG. 1.
Figure 8:
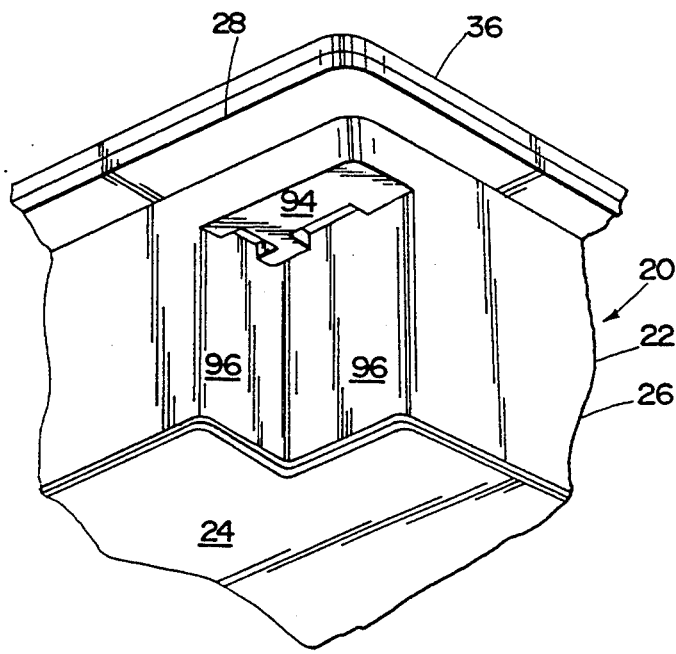
FIG. 8 is a fragmentary bottom isometric view of the base lock of FIG. 7.
Figure 11:
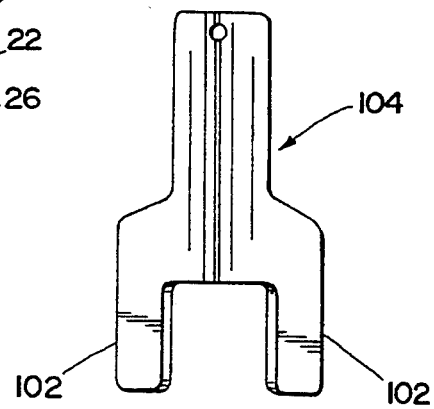
FIG. 11 is a front elevational view of the key to the lock of FIG. 10.
Figure 12:
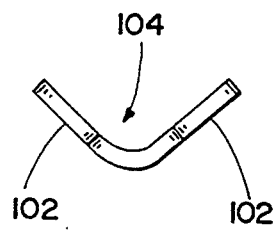
FIG. 12 is a bottom plan view of the key of FIG. 11.
Figure 9:
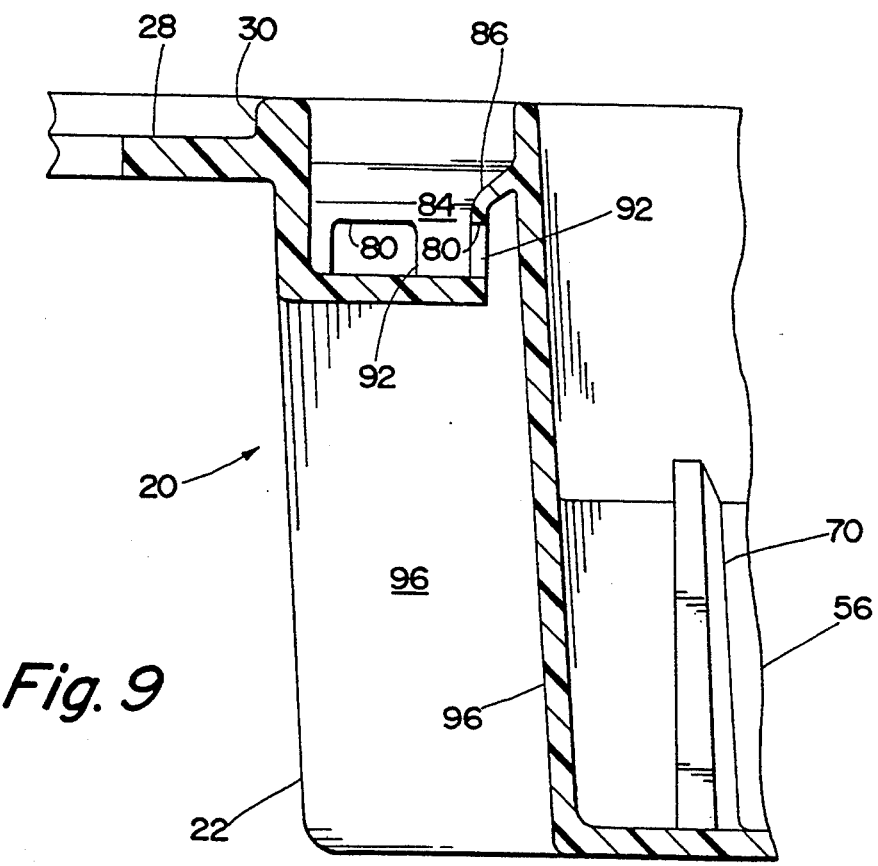
FIG. 9 is a cross-sectional view of the base lock of FIG. 7 taken along section line 9—9.

The ledges 80 are formed within inaccessible pockets 82 defined by portions of the sidewalls 26 and two inner walls 84. As shown in FIGS. 1 and 7, the inner walls 84 are perpendicular and extend downwardly from the rim 30. Each inner wall 84 has an inclined ramp segment 86 and a substantially vertical segment 88. The ramp segments engage with barbs 90 on the protrusions 78 to direct them into engagement with a ledge 80 defined by portions of the vertical segment 88 above a barb-receiving opening 92 formed in the vertical segment 88. As shown in FIG. 8, a generally triangular platform 94 extends between the two inner walls 84, and extends to two sidewall segments 96 which are spaced from the inner walls 84. The sidewall segments 96 are unbroken by openings, and hence prevent rodenticide or debris from entering the pockets 82 from the interior of the bait station 20. It should be noted that the pockets, by being located entirely within the base, are only accessed with difficulty by one who desires to tamper with the unit 20. Any attempt to manipulate the locks will be hampered by the close confines imposed by the restricted pockets.

Figure 10:
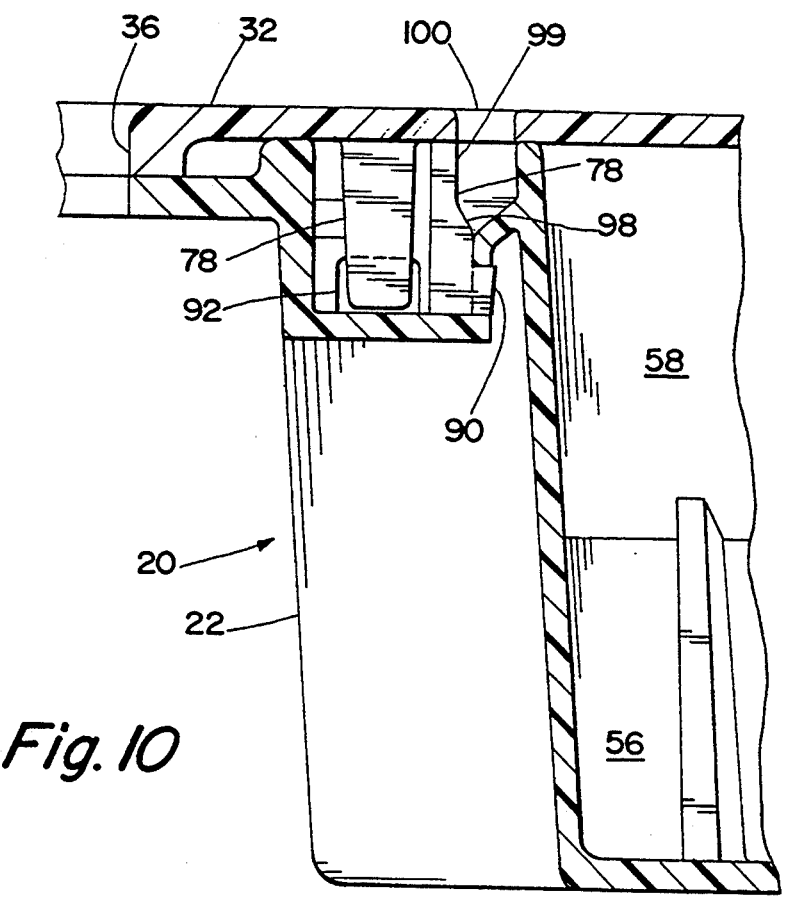
FIG. 10 is a cross-sectional view of the lock of the bait station of FIG. 4, taken along section line 10—10.

As shown in FIG. 10, the barbed protrusions 78 are integrally molded with the lid 32 and extend downwardly therefrom into the pockets 82. Four protrusions 78 are formed in two pairs of right-angle-positioned protrusions. The barbs 90 extend toward the interior of the bait station 20. Each barb 90 is formed at the lower end of a finger 99 which has a ramped surface 98 which is inclined away from the ramp segment 86 on the inner wall 84 against which the barb engages. A key hole 100 is formed in the lid 32 adjacent each finger 99. The key holes 100 allow the entrance of the flat tab 102 of a two-tabbed key 104, shown in FIGS. 11 and 12, into the pocket 82. The tabs 102 of the key 104 are formed at right angles to one another, such that they may be simultaneously inserted into a lock 76 to slide between the ramped surface 98 of a barbed protrusion 78 and the ramp segment 86 of an inner wall 84 such that pivoting of the key will drive the barbs 90 out of engagement with the ledges 80 and allow the lid 32 to be unlatched from the base 22.

The pockets 82 are positioned such that the locks 76 may be opened by bending the keys which are inserted therein generally toward the hinge 34. Thus the bait station 20 may be opened without the need to displace it from its position in a corner. Furthermore, by having two separate locks 76 an additional impediment to unauthorized access is presented while allowing the unit to be easily opened by an operator having two specially formed keys 104. The keys for each lock 76 are identical, and will be the same for all the bait stations of a model type. Hence maintenance of a number of installed bait stations requires only two keys. One key may be used to open first one lock, and then the second, although care must be taken not to close the first while opening the second.

It is understood that the invention is not limited to the particular embodiments disclosed and illustrated herein, but embraces such modified forms thereof as come within the scope of the following claims.

We claim:

1. A bait station for containing rodenticide, the bait station comprising:
    a) a molded plastic base having a floor and upwardly extending sidewalls with at least one opening to permit entry and egress of rodents;
    b) a lid joined by an integral hinge to the base, wherein the lid is pivotal about the hinge to selectively cover and uncover the base;
    c) at least one interior barrier segment which is integrally formed with the base and extends upwardly from the base floor a distance less than the height of the base sidewalls;
    d) at least one lid barrier segment which is integrally formed with the lid and which protrudes from the lid, wherein the lid barrier segment is aligned with the interior barrier segment when the lid covers the base to define a composite barrier across a portion of the base to block the passage of pests through said composite barrier; and
    e) means for restricting displacement of the lid barrier segment with respect to the base barrier segment when the lid is closed on the base.

2. A bait station for containing rodenticide, the bait station comprising:
    a) a molded plastic base having a floor and upwardly extending sidewalls with at least one opening to permit entry and egress of rodents;
    b) a lid joined by an integral hinge to the base, wherein the lid is pivotal about the hinge to selectively cover and uncover the base;
    c) at least one interior barrier segment which is integrally formed with the base and extends upwardly from the base floor a distance less than the height of the base sidewalls;
    d) at least one lid barrier segment which is integrally formed with the lid and which protrudes from the lid, wherein the lid barrier segment is aligned with the interior barrier segment when the lid covers the base to define a composite barrier across a portion of the base to block the passage of pests through said composite barrier;
    e) a first prong extending upwardly from the base interior barrier segment; and
    f) a second prong extending upwardly from the base interior barrier segment in spaced opposed relation to the first prong, such that the lid barrier segment is engaged between the first prong and the second prong to thereby restrict displacement of said lid barrier segment when the lid covers the base.

3. A bait station for containing rodenticide, the bait station comprising:
    a) a molded plastic base having a floor and upwardly extending sidewalls with at least one opening to permit entry and egress of rodents, wherein the base sidewalls comprise a hinge side wall adjacent the hinge, and a plurality of frontward side walls;
    b) a lid joined by an integral hinge to the base, wherein the lid is pivotal about the hinge to selectively cover and uncover the base;
    c) at least one interior barrier segment which is integrally formed with the base and extends upwardly from the base floor a distance less than the height of the base sidewalls;
    d) at least one lid barrier segment which is integrally formed with the lid and which protrudes from the lid, wherein the lid barrier segment is aligned with the interior barrier segment when the lid covers the base to define a composite barrier across a portion of the base to block the passage of pests through said composite barrier;
    e) a first pocket formed adjacent one of the frontward side walls, wherein the pocket is located within the base and has portions defining at least two downwardly facing ledges;
    f) a second pocket formed adjacent one of the frontward side walls, wherein the second pocket is located within the base spaced from the first pocket and has pocket walls with portions defining at least two downwardly facing ledges; and
    g) a plurality of protrusions formed on the lid and extending downwardly therefrom to engage beneath the ledges within the first and second pockets to thereby lock the lid to the base, wherein a key having two tabs thereon may be inserted into each pocket such that a tab extends between a lid protrusion and a pocket wall to unlock the protrusions engaged beneath the ledges by pivoting said key toward the hinge.

4. A bait station for containing rodenticide, the bait station comprising:
    a) a molded plastic base having a floor and a hinge side wall which extends upwardly from the floor, and a plurality of frontward side walls which extend upwardly from the floor and extend from the hinge side wall wherein the side walls define at least one opening to permit entry and egress of rodents;
    b) a lid joined by an integral hinge to the base hinge side wall, wherein the lid is pivotal about the hinge to selectively cover and uncover the base;
    c) a first pocket formed adjacent one of the frontward side walls, wherein the pocket is located within the base and has portions defining at least two downwardly facing ledges;
    d) a second pocket formed adjacent one of the frontward side walls, wherein the second pocket is located within the base spaced from the first pocket and has pocket walls with portions defining at least two downwardly facing ledges; and e) a plurality of protrusions formed on the lid and extending downwardly therefrom to engage beneath the ledges within the first and second pockets to thereby lock the lid to the base, wherein a key having two tabs thereon may be inserted into each pocket such that a tab extends between a lid protrusion and a pocket wall to unlock the protrusions engaged beneath the ledges by pivoting said key toward the hinge.

5. The bait station of claim 4 wherein each pocket is defined between a frontward sidewall and two inner walls which are substantially perpendicular to one another and which extend upwardly from the base floor.

6. The bait station of claim 5 wherein each inner wall has an inclined ramp segment and a substantially vertical segment, wherein the ramp segment engages with a barb formed on one of said lid protrusions to direct said barb into engagement with a ledge, wherein portions of each vertical segment define a barb-receiving opening, and wherein the ledge is defined by portions of the barb-receiving opening.

7. The bait station of claim 6 further comprising a generally triangular platform which extends between the two inner walls of a pocket, wherein said platform extends to two portions of the base frontward walls which are spaced from the inner walls.

8. The bait station of claim 4 wherein the bait station is adapted for placement in a corner where two room walls meet, and wherein the hinge side wall is positioned away from the corner, and wherein the frontward side walls comprise:

a) a first side wall which extends from the hinge side wall toward the corner;

b) a second side wall which extends from the first side wall and which is adapted to be positioned against one of the room walls of the corner;

c) a third side wall which extends at an obtuse angle from the second wall;

d) a fourth side wall which extends from the third side wall at an obtuse angle and which is substantially perpendicular to the second side wall to thereby be positioned against the other of the room walls of the corner; and e) a fifth side wall which extends from the fourth side wall to the hinge side wall, wherein the pockets are defined between the second and third side walls and between the third and fourth sidewalls.

9. A bait station for containing rodenticide, the bait station comprising:

a) a molded plastic base having a floor and upwardly extending sidewalls with at least one opening to permit entry and egress of rodents;

b) a lid joined by an integral hinge to the base, wherein the lid is pivotal about the hinge to selectively cover and uncover the base;

c) at least one interior barrier segment which is integrally formed with the base and extends upwardly from the base floor;

d) at least one lid barrier segment which is integrally formed with the lid and which protrudes from the lid, wherein the lid barrier segment is aligned with the interior barrier segment when the lid covers the base to define a composite barrier across a portion of the base to block the passage of pests through said composite barrier;

e) a first prong extending upwardly from the base interior barrier segment; and f) a second prong extending upwardly from the base interior barrier segment in spaced opposed relation to the first prong, such that the lid barrier segment when it covers the base is engaged between the first prong and the second prong to thereby restrict displacement of said lid barrier segment.

* * * * *